(12) United States Patent
Fukushima et al.

(10) Patent No.: US 11,802,853 B2
(45) Date of Patent: Oct. 31, 2023

(54) SAMPLE INJECTION DEVICE AND SAMPLE INJECTION SYSTEM

(71) Applicant: Shimadzu Corporation, Kyoto (JP)

(72) Inventors: Daiki Fukushima, Kyoto (JP); Gregory King, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/516,474

(22) Filed: Jul. 19, 2019

(65) Prior Publication Data

US 2020/0110063 A1    Apr. 9, 2020

(30) Foreign Application Priority Data

Oct. 3, 2018    (JP) .................................. 2018-188515

(51) Int. Cl.
*G01N 30/16*    (2006.01)
*G01N 30/06*    (2006.01)
*G01N 30/40*    (2006.01)

(52) U.S. Cl.
CPC ............. *G01N 30/16* (2013.01); *G01N 30/06* (2013.01); *G01N 2030/402* (2013.01)

(58) Field of Classification Search
CPC ..... G01N 35/1004; G01N 30/06; G01N 30/18
USPC ........................................................ 134/26
See application file for complete search history.

(56) References Cited

U.S. PATENT DOCUMENTS

| 7,178,414 B1 * | 2/2007 | Kokosa .................. G01N 30/24 |
| | | 73/863.32 |
| 2006/0027490 A1 * | 2/2006 | DeMarco ............... G01N 30/88 |
| | | 210/198.2 |
| 2006/0207941 A1 * | 9/2006 | Morikawa .............. G01N 30/88 |
| | | 210/656 |
| 2010/0294319 A1 * | 11/2010 | Massaro ................. B08B 9/00 |
| | | 134/23 |
| 2011/0088722 A1 * | 4/2011 | Geissler .................... B08B 3/14 |
| | | 134/12 |
| 2013/0220037 A1 * | 8/2013 | White ................ G01N 35/1004 |
| | | 73/864.81 |
| 2014/0144462 A1 * | 5/2014 | Verhaverbeke ....... B08B 7/0021 |
| | | 134/1.2 |
| 2014/0363896 A1 | 12/2014 | Suzuki et al. |
| 2018/0047560 A1 * | 2/2018 | Mertens .................... B08B 3/08 |
| 2018/0156702 A1 | 6/2018 | Suzuki et al. |

FOREIGN PATENT DOCUMENTS

| JP | H04366743 A | 12/1992 |
| JP | H06-102262 A | 4/1994 |
| JP | 2012042253 A | 3/2012 |
| JP | 2014002099 A | 1/2014 |

(Continued)

OTHER PUBLICATIONS

JPH06102262—Machine Translation (Year: 1994).*

(Continued)

*Primary Examiner* — Marc Lorenzi
(74) *Attorney, Agent, or Firm* — Muir Patent Law, PLLC

(57) ABSTRACT

A sample injection device is provided with a syringe for injecting a sample and an arrangement unit in which plural kinds of cleaning solvents are arranged to clean the syringe. The device is configured to be able to set a cleaning order of the syringe by the plural kinds of cleaning solvents.

5 Claims, 7 Drawing Sheets

When the polarity of the sample is small

Before injection

After injection

(56) References Cited

FOREIGN PATENT DOCUMENTS

JP    2017075963 A    4/2017

OTHER PUBLICATIONS

Notice of Reasons for Refusal dated Feb. 22, 2022 issued in corresponding Japanese Patent Application No. 2018-188515.
First Office Action dated Jan. 5, 2023 issued in relation to the corresponding Chinese Patent Application No. 201910944194.3 together with an machine English translation thereof.

* cited by examiner

| Cleaning order | | Solvent kind | Cleaning solvent amount | Number of times of cleaning | Remaining amount of cleaning solvent |
|---|---|---|---|---|---|
| Before injection | 1 | A ▼ | X μL | 1 time | 70% |
| | 2 | C ▼ | Z μL | 1 time | 100% |
| | ⋮ | | | | |
| After injection | 1 | A ▼ | X μL | 2 times | 70% |
| | 2 | B ▼ | Y μL | 1 time | 90% |
| | ⋮ | | | | |

When the viscosity of the sample is small

When the viscosity of the sample is large

A2

| Candidate substance | Viscosity (cP, at 20°C) | Polarity (D) | Injection rate ($\mu$L/min) | Suction rate ($\mu$L/min) |
|---|---|---|---|---|
| Acetone | 0.32 | 2.91 | 6000 | 6000 |
| Hexane | 0.31 | 0.08 | 6000 | 6000 |
| DMSO | 1.996 | 3.96 | 1000 | 1000 |
| Water | 1 | 1.85 | 3000 | 3000 |
| Methanol | 0.55 | 1.69 | 5000 | 5000 |

FIG. 7

SAMPLE INJECTION DEVICE AND SAMPLE INJECTION SYSTEM

CROSS-REFERENCE TO RELATED APPLICATIONS

The related application number JP2018-188515, entitled "sample injection device and sample injection system", filed on Oct. 3, 2018, invented by Daiki Fukushima and Gregory King, upon which this patent application is based is hereby incorporated by reference.

BACKGROUND OF THE INVENTION

Field of the Invention

The present invention relates to a sample injection device and a sample injection system, and more particularly to a sample injection device and a sample injection system for cleaning a syringe by cleaning solvents.

Description of the Background Art

Conventionally, a sample injection device for cleaning a syringe by a cleaning solvent is known. Such a device is disclosed in, for example, Japanese Unexamined Patent Application Publication No. H6-102262.

In the aforementioned Japanese Unexamined Patent Application Publication No. H6-102262, a sample injection device for a gas chromatography apparatus is disclosed. The sample injection device is attached to a gas chromatography apparatus which is an analysis device, and is provided with a micro syringe for injecting a sample which is an analysis subject into the gas chromatography equipment. Further, in this sample injection device, for the purpose of keeping the micro syringe in a clean state, cleaning of the micro syringe by a cleaning solvent is performed before and after the injection of the sample. At this time, the cleaning of the micro syringe by the cleaning solvent is performed by sucking and then discharging the cleaning solvent.

Here, in a conventional sample injection device as described in the above-mentioned Japanese Unexamined Patent Application Publication No. H6-102262, although not clearly described in the above-mentioned Japanese Unexamined Patent Application Publication No. H6-102262, cleaning of a micro syringe may sometimes be performed by using plural kinds of cleaning solvents such as water and an organic solvent. Further note that in such a conventional sample injection device, the cleaning order of the micro syringe by plural kinds of cleaning solvents is fixed, so the user could only clean the micro syringe by plural kinds of cleaning solvents in a fixed cleaning order.

Here, as a result of intensive studies, considering the fact that it is sometimes possible to enhance the cleaning effect of a micro syringe by plural kinds of cleaning solvents simply by changing the cleaning order, the inventors of the present invention have newly found that there is a need to increase the cleaning effect of a micro syringe by plural kinds of cleaning solvents by improving the degree of freedom in setting of the cleaning.

SUMMARY OF THE INVENTION

The present invention has been made to solve the aforementioned problems, and one object of the present invention is to provide a sample injection device and a sample injection system capable of enhancing the cleaning effect of a syringe by plural kinds of cleaning solvents by improving the degree of freedom in setting of the cleaning order.

In order to attain the aforementioned object, a sample injection device according to one aspect of the present invention includes: a syringe for injecting a sample; and an arrangement unit in which plural kinds of cleaning solvents for cleaning the syringe are arranged, wherein it is configured to be able to set a cleaning order of the syringe by the plural kinds of cleaning solvents.

In the sample injection device according to the first aspect of the present invention, by configuring as described above, unlike the case in which the cleaning order of the syringe by plural kinds of cleaning solvents is fixed, the cleaning order of the syringe by plural kinds of cleaning solvents can be changed, so the degree of freedom in setting of the cleaning order can be improved. As a result, for example, the cleaning order can be changed such that a cleaning solvent having high cleanliness due to the small number of times of use cleans the syringe immediately before an injection of a sample. In this case, by performing the cleaning of the syringe immediately before the sample injection by a cleaning solvent with high cleanliness, a mixture of the previous sample into the current sample (so-called carryover) can be effectively reduced. Therefore, the cleaning effect of the syringe by plural kinds of cleaning solvents can be effectively enhanced.

Further, for example, the cleaning order can be changed so that the plural kinds of cleaning solvents are used in the polarity order. In this case, it is possible to enhance the cleaning effect of the syringe by plural kinds of cleaning solvents by taking advantage of the fact that substances close in polarity are soluble with each other. As described above, by improving the degree of freedom in setting of the cleaning order, it is possible to provide a sample injection device capable of enhancing the cleaning effect of the syringe by plural kinds of cleaning solvents.

In the sample injection device according to the first aspect of the present invention, preferably, it is configured to be able to individually set the cleaning order before an injection of the sample by the syringe and the cleaning order after the injection of the sample by the syringe.

By configuring as described above, before and after the injection of the sample by the syringe, the cleaning order of the syringe by plural kinds of cleaning solvents can be changed individually, so the degree of freedom in setting of the cleaning order can be further improved. As a result, the cleaning effect of the syringe by plural kinds of cleaning solvents can be further enhanced.

In the sample injection device according to the first aspect of the present invention, preferably, it is configured such that the cleaning order specified by a user is set as the cleaning order.

By configuring as described above, it is possible to set the cleaning order desired by the user as a cleaning order. As a result, the user can set the cleaning order suitable for the physical properties of the sample and/or the cleaning solvents. Therefore, the cleaning effect of the syringe by plural kinds of cleaning solvents can be assuredly enhanced depending on the physical properties of the sample and/or the cleaning solvents.

In the sample injection device according to the first aspect of the present invention, preferably, it is configured such that the cleaning order is set according to physical properties of the sample.

By configuring as described above, the cleaning order suitable for physical properties of the sample can be automatically set, so it is possible to save time and labor of the user for setting the cleaning order. Further, even if the user is not familiar with the physical properties of the sample, the cleaning order suitable for the physical properties of the sample is automatically set, so that it is possible to easily enhance the cleaning effect of the syringe by plural kinds of cleaning solvents.

In this case, preferably, it is configured such that the cleaning order is set so that the plural kinds of cleaning solvents become in a polarity order according to a polarity of the sample.

By configuring as described above, it is possible to easily and assuredly set the cleaning order with a high cleaning effect by taking advantage of the fact that substances close in polarity are soluble with each other.

In the configuration in which the cleaning order is set according to the physical properties of the sample, preferably, it is configured such that physical properties of the sample or the cleaning solvent are acquired based on pre-stored candidate substance information indicating physical properties of a candidate substance which is a candidate of the sample or the cleaning solvent.

By configuring as described above, if there is a sample or a cleaning solvent to be used by the user among the candidate substances of candidate substance information pre-stored in advance, the user can acquire the physical properties of the sample or the cleaning solvent simply by selecting the sample or the cleaning solvent to be used among from the candidate substances of the candidate substance information. In this case, the user is not required to perform the operation of entering the physical properties of the sample or the cleaning solvent, which eliminates the need for the user to perform the operation of inputting the physical properties of the sample or the cleaning solvent.

In the sample injection device according to the first aspect of the present invention, preferably, it is configured such that a number of times of cleaning the syringe by the cleaning solvent is set according to physical properties of the sample.

By configuring as described above, it is possible to automatically set the number of times of cleaning suitable for the physical properties of the sample, so that it is possible to save time and labor of the user for setting the number of times of cleaning. Further, even if the user is not familiar with the physical properties of the sample, the cleaning order suitable for the physical properties of the sample is automatically set, so that it is possible to easily enhance the cleaning effect of the syringe by plural kinds of cleaning solvents.

In this case, preferably, it is configured such that the number of times of cleaning is set so that the number of times of cleaning increases as viscosity of the sample increases.

By configuring as described above, since the adhesion amount of the sample to the syringe increases as the viscosity of the sample increases, it is possible to easily and assuredly set the number of times of cleaning with high cleaning effect in consideration of the increase in number of times of cleaning.

In the sample injection device according to the first aspect of the present invention, preferably, a plurality of cleaning solvents of the same kind is arranged in the arrangement unit, and the sample injection device further comprises a control unit configured to perform a control to change the cleaning solvent to be used so that a new cleaning solvent of the same kind as a used-up cleaning solvent is used when the cleaning solvent is used up.

Here, when using a cleaning solvent, the cleaning solvent volatilizes during use since the septum (lid) of the vial containing the cleaning solvent is pierced with the syringe. For this reason, when using plural cleaning solvents of the same kind in parallel, solvents evaporate in all of the plural cleaning solvents being used in parallel. In this case, there is a disadvantage that the volatilization amount of the cleaning solvent is increased. Therefore, by configuring as described above, after using up a certain cleaning solvent, it is possible to use a new cleaning solvent of the same kind as the used-up cleaning solvent, so that, unlike the case of using plural cleaning solvents of the same kind in parallel, as to the unused cleaning solvent, the solvent is prevented from being volatilized until the start of use. As a result, the volatilization amount of the cleaning solvent can be reduced, so that cleaning solvents of the same kind can be efficiently used when plural cleaning solvents of the same kind are prepared.

A sample injection system according to the second aspect of the present invention, includes: a setting device; and a sample injection device including a syringe for injecting a sample and an arrangement unit in which plural kinds of cleaning solvents for cleaning the syringe are arranged, wherein the sample injection device is configured to be able to set a cleaning order of the syringe by the plural kinds of cleaning solvents with the setting device.

In the sample injection system according to the second aspect of the present invention, by configuring as described above, similar to the sample injection device according to the first aspect of the present invention, it is possible to provide a sample injection system capable of enhancing the cleaning effect of the syringe by plural kinds of cleaning solvents by improving the degree of freedom in setting of the cleaning order.

BRIEF DESCRIPTION OF THE DRAWINGS

FIG. 7 is a diagram for explaining candidate substance information of the setting device according to an embodiment of the present invention.

DESCRIPTION OF PREFERRED EMBODIMENTS

Hereinafter, embodiments of the present invention will be described with reference to the attached drawings. With reference to FIG. 1 to FIG. 8, the configuration of the sample injection system 100 according to an embodiment of the present embodiment will be described.
(Configuration of Sample Injection System)

Figure 1:
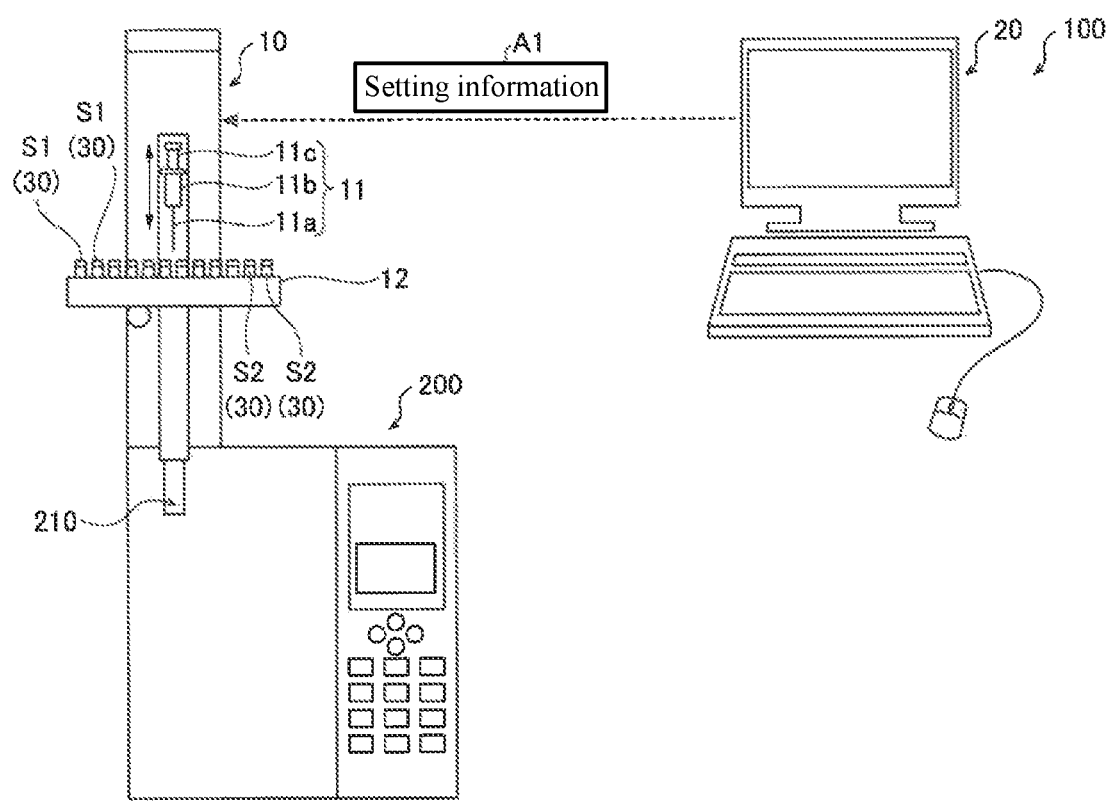
FIG. 1 is a schematic diagram showing a sample injection system according to an embodiment of the present invention.

As shown in FIG. 1, the sample injection system 100 is provided with a sample injection device 10 and a setting device 20. The sample injection device 10 is a device for injecting a sample S1 (liquid sample), which is an analysis subject, into a sample introduction portion 210 of the chromatography apparatus 200, which is an analysis device. The sample injection device 10 is attached to the chromatography apparatus 200. The setting device 20 is a device that a user sets the sample injection device 10. The setting device 20 is, for example, a personal computer in which a program for setting the sample injection device 10 is installed.

The sample injection device 10 and the setting device 20 are communicably connected to each other by wire or wirelessly. The setting device 20 transmits the setting information A1 generated based on the operation of the user to the sample injection device 10. The sample injection device 10 performs the operation related to the injection of the sample S1 based on the setting information A1 received from the setting device 20.

The sample injection device 10 is provided with a syringe 11 for sucking and discharging samples S1. The syringe 11 includes a needle 11a, a cylindrical portion 11b, and a plunger 11c.

The needle 11a is a hollow needle and is provided at the tip end portion of the cylindrical portion 11b. The cylindrical portion 11b is configured to accommodate and hold the sample S1 sucked through the needle 11a.

The plunger 11c is a piston and is inserted in the cylindrical portion 11b so as to be reciprocally movable.

The syringe 11 is configured to suck the sample S1 into the cylindrical portion 11b via the needle 11a by moving the plunger 11c in the suction direction. The syringe 11 is configured to discharge the sample S1 from the inside of the cylindrical portion 11b via the needle 11a by moving the plunger 11c in the discharge direction opposite to the suction direction. Thus, the syringe 11 is configured to inject the sample S1 into the sample introduction portion 210 of the chromatography apparatus 200. The syringe 11 is configured to be movable in the vertical direction by a moving mechanism (not shown). The syringe 11 may be configured to be movable not only in the vertical direction but also in the horizontal direction.

The sample injection device 10 is provided with an arrangement unit 12 for arranging samples S1. The arrangement unit 12 is an arrangement table on which a plurality of samples S1 can be arranged. The sample S1 is arranged on the arrangement unit 12 in a state of being accommodated in a vial 30, which is a glass container. In the arrangement unit 12, cleaning solvents S2, such as, e.g., water, methanol, and hexane, for cleaning the syringe 11, are arranged. In the arrangement unit 12, plural kinds of cleaning solvents S2 are arranged, or a plurality of cleaning solvents S2 of the same kind is arranged. The cleaning solvent S2 is arranged in the arrangement unit 12 in a state of being accommodated in a vial 30. The arrangement unit 12 is a table for performing suction of, for example, the sample S1 and the cleaning solvent S2. Further, for example, the arrangement unit 12 is a table for waiting for samples S1 or cleaning solvents S2 supplied to a table for performing suction of the sample S1 or the cleaning solvent S2.

Cleaning of the syringe 11 by the cleaning solvent S2 is performed at least either one of before injection of the sample S1 and after injection of the sample S1 in order to keep the syringe 11 clean. Specifically, the syringe 11 is cleaned by the cleaning solvent S2 by sucking and discharging the cleaning solvent S2 by the syringe 11. As a result, the inside of the needle 11a and the cylindrical portion 11b of the syringe 11 can be cleaned by the cleaning solvent S2, so that it is possible to suppress the sample S1 used in the previous analysis from being mixed in the sample S1 to be used in the next analysis.

Figure 2:
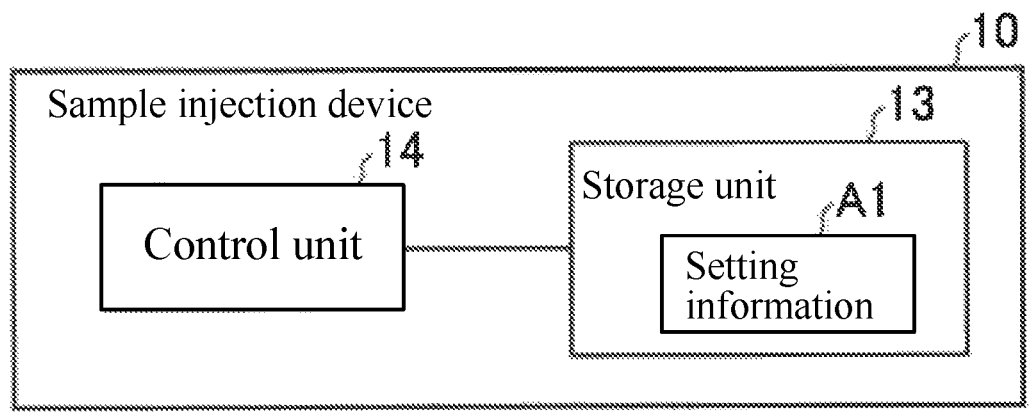
FIG. 2 is a block diagram showing a sample injection device according to an embodiment of the present invention.

Further, as shown in FIG. 2, the sample injection device 10 is provided with a storage unit 13 and a control unit 14. The storage unit 13 is a storage medium including, for example, a flash memory, and is configured to store information. In the storage unit 13, the setting information A1 received from the setting device 20 is stored. The control unit 14 includes a processor such as a CPU, a memory, and the like, and is configured to control the operation of the sample injection device 10 based on the setting information A1 stored in the storage unit 13.

Figure 3:
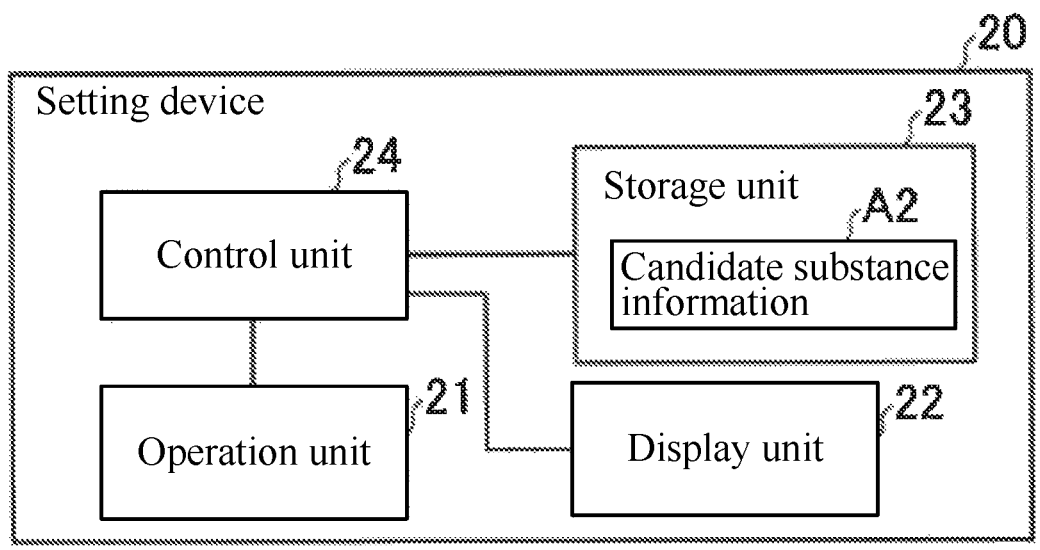
FIG. 3 is a block diagram showing a setting device according to an embodiment of the present invention.

As shown in FIG. 3, the setting device 20 is provided with an operation unit 21, a display unit 22, a storage unit 23, and a control unit 24. The operation unit 21 is, for example, a mouse or a keyboard, and is provided for the user to perform an operation such as a setting operation of the sample injection device 10 by the setting device 20. The display unit 22 is, for example, a liquid crystal monitor, and is configured to display information such as a setting screen for setting the sample injection device 10. The storage unit 23 is a storage medium including, for example, a flash memory, and is configured to store information. In the storage unit 23, candidate substance information A2 regarding a candidate substance which is a candidate for the sample S1 or the cleaning solvent S2 is stored in advance. The details of the candidate substance information A2 will be described later. The control unit 24 includes a processor, such as, e.g., a CPU, and a memory, and is configured to control the operation of the setting device 20.
(Configuration Related to Cleaning Setting)

Figures 4A, 4B:
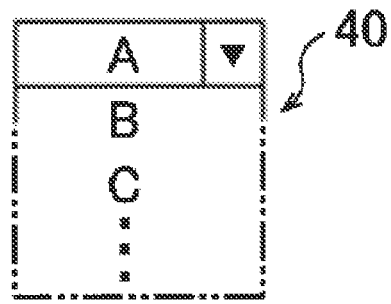
FIG. 4A is a diagram showing a setting screen of a setting device according to an embodiment of the present invention.
FIG. 4B is a diagram for explaining the selection of the kind of a cleaning solvent on the setting screen of the setting device according to an embodiment of the present invention.

As shown in FIG. 4A, the setting device 20 is configured to be able to perform the setting related to the cleaning of the syringe 11 by the cleaning solvent S2 in the sample injection device 10. The control unit 24 of the setting device 20 performs the control to display the setting screen 40 on the display unit 22 when performing the setting regarding the cleaning of the syringe 11 by the cleaning solvent S2 in the sample injection device 10. The setting screen 40 includes the information for setting the cleaning order by the cleaning solvents S2, the information for setting the kind of the cleaning solvent S2 to perform the cleaning, the information for setting the cleaning solution amount of the cleaning solvent S2, the information for setting the number of times of cleaning by the cleaning solvent S2, and the information indicating the remaining amount of the cleaning solvent S2. Further, the control unit 24 of the setting device 20 receives the setting operation related to the cleaning of the syringe 11 by the cleaning solvent S2 in the sample injection device 10 using the operation unit 21.

Here, in this embodiment, the sample injection device 10 is configured to be able to set, by the setting device 20, the kinds of the cleaning solvents S2 for cleaning the syringe 11, the cleaning order of the syringe 11 by plural kinds of the cleaning solvents S2, the amount of the cleaning solvent for each of plural kinds of cleaning solvents S2, and the number of times of cleanings by each of plural kinds of cleaning solvents S2. The control unit 14 of the sample injection device 10 is configured to operate the sample injection device 10 so as to clean the syringe 11 by plural kinds of cleaning solvents S2, the cleaning order, the amount of the cleaning solvent, and the number of times of cleaning, which are set by the setting device 20.

Further, in this embodiment, the sample injection device 10 is configured to be able to individually set the cleaning solvent S2, the cleaning order, the amount of the cleaning solvent, and the number of times of cleaning before and after injection of the sample S1. Further, the sample injection device 10 is configured to be able to manually set the cleaning solvent S2, the cleaning order, the amount of the cleaning solvent, and the number of times of cleaning by the user. The sample injection device 10 is configured such that the cleaning solvent S2, the cleaning order, the amount of the cleaning solvent, and number of times of cleaning, which are specified by the user using the operation unit 21 of the setting device 20, are set as the cleaning solvent S2, the cleaning order, the amount of the cleaning solvent, and the number of times of cleaning, respectively.

For example, first, the user specifies the cleaning solvent S2 for cleaning the syringe 11 as for the first cleaning order before the injection of the sample S1 using the operation unit 21 of the setting device 20. At this time, as shown in FIG. 4B, the user selects and specifies the cleaning solvent S2 for cleaning the syringe 11 among from the candidate substances displayed on the setting screen 40. In the storage unit 23 of the setting device 20, information on representative samples S1 and/or cleaning solvents S2 is stored in advance as candidate substance information A2.

If there is no cleaning solvent S2 for cleaning the syringe 11 in the candidate substances, the user may enter the cleaning solvent S2 which is not listed in the candidate substances to store it in the setting device 20. Then, the user inputs the amount of the cleaning solvent and the number of times of cleaning for the specified cleaning solvent S2 to specify them using the operation unit 21 of the setting device 20. The user performs these operations for each of the cleaning solvents S2 for cleaning the syringe 11. As a result, the cleaning solvent S2, the cleaning order, the amount of the cleaning solvent, and the number of times of cleaning before and after the injection of the sample S1 are specified by the user, respectively.

In addition, the information showing the kind of the cleaning solvent S2 is associated with the position information showing the position of the actual cleaning solvent S2 in the arrangement unit 12. For this reason, the sample injection device 10 can acquire the actual position of the cleaning solvent S2 in the arrangement unit 12 based on the kind of the cleaning solvent S2. As a result, the sample injection device 10 is configured to be able to change the kind of the cleaning solvents S2 to be actually used and the cleaning order to be actually executed only by changing the kind and cleaning order of the cleaning solvents S2 on the setting. As a result, since the user is not required to change the position of the cleaning solvent S2 in the arrangement unit 12, it is possible to save time and labor of the user.

Figure 5A:
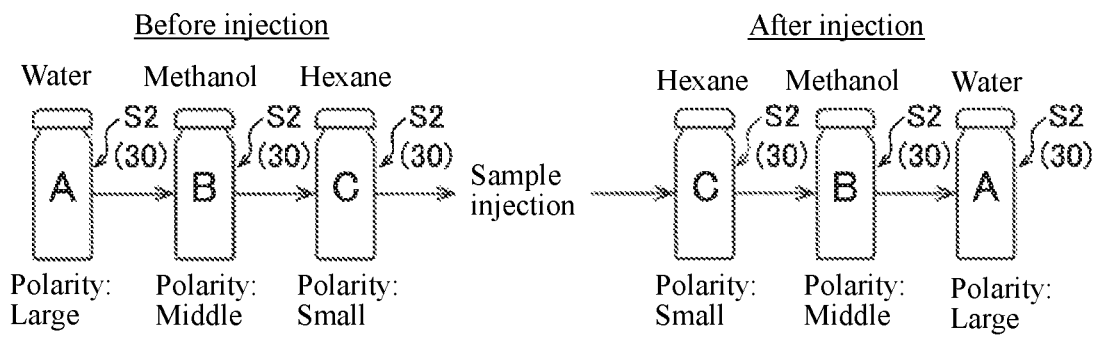
FIG. 5A is a diagram for explaining the setting of the cleaning order by cleaning solvents when the polarity of the sample is small in the sample injection device according to an embodiment of the present invention.
Figure 5B:
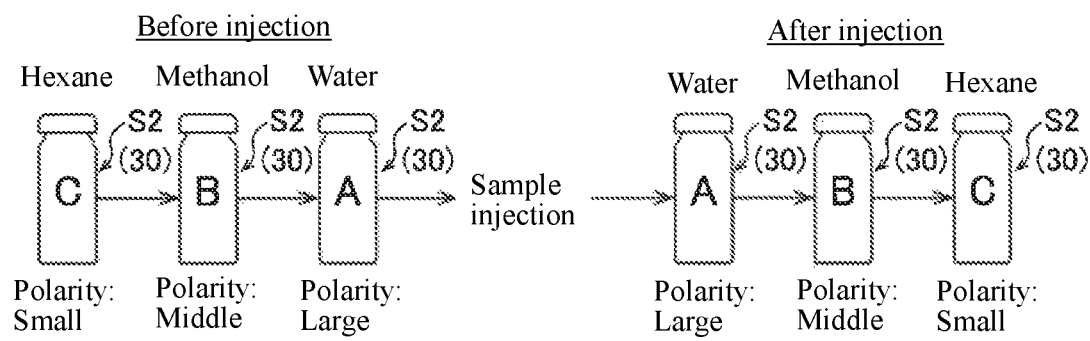
FIG. 5B is a diagram for explaining the setting of the cleaning order by cleaning solvents when the polarity of the sample is large in the sample injection device according to an embodiment of the present invention.

Further, as shown in FIG. 5A and FIG. 5B, the sample injection device 10 is configured to be able to automatically set the cleaning order. The sample injection device 10 is configured such that the cleaning order is set according to the physical properties of the sample S1. Specifically, the sample injection device 10 is configured to set the cleaning order so that the plural kinds of cleaning solvents S2 become in the polarity order depending on the polarity of the sample S1. Further, the sample injection device 10 is configured to set the cleaning order so that the plural kinds of cleaning solvents S2 become opposite in the polarity orders before and after the injection of the sample S1 according to the polarity of the sample S1.

For example, when the polarity of the sample S1 is small, as shown in FIG. 5A, the cleaning order is set such that before the injection of the sample S1, the plural kinds of the cleaning solvents S2 gradually become in the polarity order of decreasing their polarities, and after the injection of sample S1, the plural kinds of the cleaning solvents S2 gradually become in the polarity order of increasing their polarities. In this case, the cleaning order is set so that the cleaning of the syringe 11 by the cleaning solvent S2 close to the polarity of the sample S1 among the plural kinds of cleaning solvents S2 is performed immediately before and after the injection of the sample S1. Note that the case in which the polarity of the sample S1 is small means, for example, the case in which the polarity of the sample S1 is equal to or less than a predetermined threshold value.

As a specific example, in cases where water, methanol, and hexane are specified by the user as cleaning solvents S2, before the injection of the sample S1, the cleaning order is set in the order of water, methanol, and hexane from the earlier cleaning order to the later cleaning order. Further, in this case, after the injection of the sample S1, the cleaning order is set in order of hexane, methanol, and water from the earlier cleaning order to the later cleaning order.

Further, for example, in cases where the polarity of the sample S1 is large, as shown in FIG. 5B, the cleaning order is set so that the kinds of the cleaning solvents S2 become in the polarity order in which the polarity gradually increases before the injection of the sample S1, and the kinds of the cleaning solvents S2 become in the polarity order in which the polarity gradually decreases after the injection of the sample S1. Also in this case, the cleaning order is set so that immediately before and after the injection of the sample S1, the cleaning of the syringe 11 by the cleaning solvent S2 which is close to the polarity of the sample S1 among plural kinds of cleaning solvents S2 is performed. Note that the case in which the polarity of the sample S1 is large means, for example, the case in which the polarity of the sample S1 is equal to or larger than a predetermined threshold value.

As a specific example, in cases where water, methanol, and hexane are specified by the user as cleaning solvents S2, before the injection of the sample S1, the cleaning order is set in the order of hexane, methanol, and water from the earlier cleaning order to the later cleaning order. Further, in this case, after the injection of the sample S1, the cleaning order is set in order of water, methanol, and hexane from the earlier cleaning order to the later cleaning order.

When setting the cleaning order automatically, the user performs an operation for automatically setting the cleaning order in the setting device 20 using the operation unit 21 of the setting device 20. Upon receipt of the operation of the user, the control unit 24 of the setting device 20 is configured to perform the control to determine and set the cleaning order in accordance with the physical properties of the sample S1. Specifically, the control unit 24 of the setting device 20 is configured to perform the control to determine and set the cleaning order as described above according to the polarity of the sample S1.

The determined cleaning order is presented to the user by being displayed on the display unit 22 of the setting device 20. The user can further change the determined cleaning order using the operation unit 21 of the setting device 20.

Figure 6A:
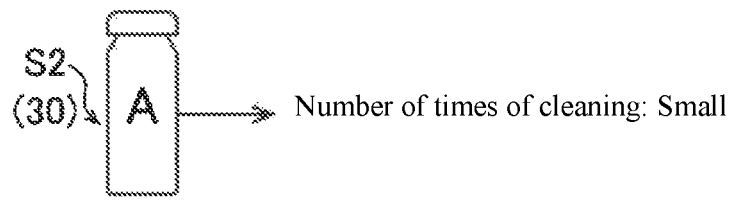
FIG. 6A is a diagram for explaining the setting of the number of times of cleaning by the cleaning solvent when the sample viscosity is small in the sample injection device according to an embodiment of the present invention.
Figure 6B:
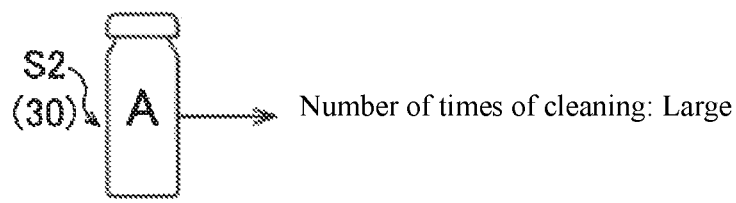
FIG. 6B is a diagram for explaining the setting of the number of times of cleaning by the cleaning solvent when the sample viscosity is large in the sample injection device according to an embodiment of the present invention.
Figure 8A:
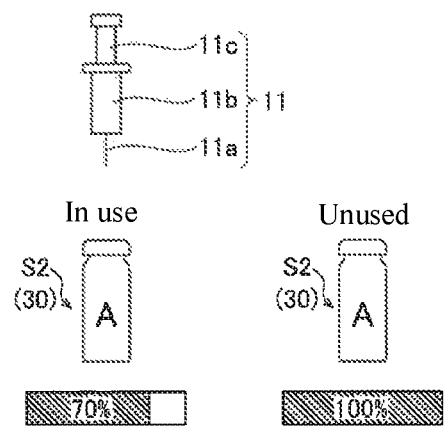
FIG. 8A is a diagram showing a state where a cleaning solvent is in use in a sample injection device according to an embodiment of the present invention.
Figure 8B:
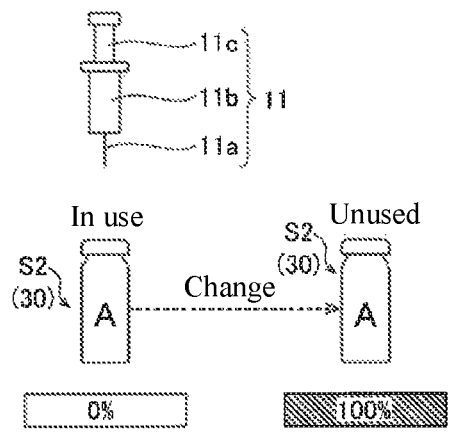
FIG. 8B is a diagram showing a state in which a cleaning solvent has been used up in a sample injection device according to an embodiment of the present invention.
Figure 8C:
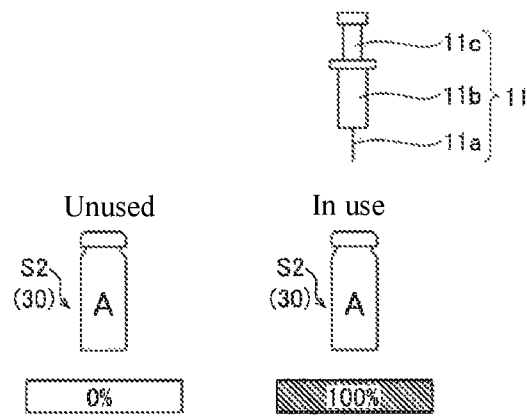
FIG. 8C is a diagram showing a state in which a cleaning solvent used has been changed to a new cleaning solvent in the sample injection device according to the embodiment of the present invention.

Further, as shown in FIG. 6A and FIG. 6B, the sample injection device 10 is configured to be able to automatically set the number of times of cleaning. The sample injection device 10 is configured such that the number of times of cleaning is set according to the physical properties of the sample S1. Specifically, the sample injection device 10 is configured such that the number of times of cleaning is set so that the number of times increases as the viscosity (coefficient of viscosity) of the sample S1 increases. In addition, the sample injection device 10 is configured such that the number of times of cleaning corresponding to the viscosity of the sample S1 is set before and after the injection of the sample S1.

For example, based on a predetermined threshold value range, the number of times of cleaning corresponding to the viscosity of the sample S1 is set. In this case, for example, when the viscosity of the sample S1 is within the threshold value range, the number of times of cleaning is set to a predetermined number of times. When the viscosity of the sample S1 is smaller than the threshold value range, the number of times of cleaning is set to a number of times smaller than a predetermined number of times. When the viscosity of the sample S1 is larger than the threshold value range, the number of times of cleaning is set to the number of times larger than a predetermined number of times.

Note that the threshold value range may be one or more than one. Also note that the number of times of cleaning may be set automatically for all of the plural kinds of the cleaning solvents S2 for performing the cleaning of the syringe 11, or may be set automatically for a part of the plural kinds of the cleaning solvents S2 for cleaning the syringe 11. When the number of times of cleaning is set automatically for a part of the plural kinds of the cleaning solvents, for example, the number of times of cleaning may be set for the cleaning solvent S2 in which the cleaning order is immediately before or after the sample S1.

When the number of times of cleaning is automatically set, the user performs an operation for automatically setting the number of times of cleaning in the setting device 20 using the operation unit 21 of the setting device 20. Upon receipt of the operation of the user, the control unit 24 of the setting device 20 is configured to perform the control to determine and set the number of times of cleaning in accordance with the physical properties of the sample S1. Specifically, the control unit 24 of the setting device 20 is configured to perform the control to determine and set the number of times of cleaning as described above according to the viscosity of the sample S1.

The determined number of times of cleaning is presented to the user by being displayed on the display unit 22 of the setting device 20. The user can further change the determined number of times of cleaning using the operation unit 21 of the setting device 20.

Further, in this embodiment, as shown in FIG. 7, the sample injection device 10 is configured such that the physical properties (viscosity, polarity) of the sample S1 or the cleaning solvent S2 are acquired based on the candidate substance information pre-stored in the storage unit 23 of the setting device 20 and indicating the physical properties of the candidate substance which is a candidate of the sample S1 or the cleaning solvent S2. The candidate substance information A2 is a table including the information on physical properties (viscosity (coefficient of viscosity)) and polarity (dipole moment)) of the candidate substance. The candidate substance information A2 shown in FIG. 7 includes acetone, hexane, DMSO (dimethyl sulfoxide), water, and methanol as candidate substances which are typical samples S1 or cleaning solvents S2.

In the case of automatically set the cleaning order or the number of times of cleaning as above, the user specifies in advance the sample S1 to be analyzed or the cleaning solvent S2 to be cleaned from candidate substance by using the operation unit 21 of the setting device 20. In cases where the sample S1 to be analyzed or the cleaning solvent S2 for cleaning is specified from among candidate substances, the control unit 24 of the setting device 20 is configured to acquire the physical properties (viscosity, polarity) of the sample S1 or the cleaning solvents S2 based on the candidate substance information A2.

In cases where there is no sample S1 to be analyzed or cleaning solvents S2 for cleaning in the candidate substances, the user may input the physical properties of the sample S1 or cleaning solvents S2 which are not found in the candidate substances to stored them in the setting device 20.

Further, the candidate substance information A2 includes the information on the appropriate injection rate of the candidate substance by the syringe 11 and the information on the appropriate suction rate of the candidate substance by the syringe 11. In cases where the sample S1 to be analyzed or the cleaning solvent S2 for cleaning is specified from among candidate substances, the control unit 24 of the setting device 20 is configured to acquire the injection rate and the suction rate by the syringe 11 of the sample S1 or the cleaning solvent S2 based on the candidate substance information A2. Thus, the sample injection device 10 is configured to set the injection rate and the suction rate by the syringe 11 of the sample S1 or the cleaning solvent S2 based on the candidate substance information A2.

(Configuration Related to Changing of Cleaning Solvent)

There is a case where a plurality of cleaning solvents S2 of the same kind is arranged in the arrangement unit 12. In this case, the control unit 14 of the sample injection device 10 is configured to, when the the cleaning solvent S2 is used up, control to change the cleaning solvent S2 to be used so as to use a new cleaning solvent S2 (the unused spare cleaning solvent S2) of the same kind as the used-up cleaning solvent S2.

Specifically, the control unit 14 of the sample injection device 10 is configured to acquire the used amount of the cleaning solvent S2 in use based on the past state of use (the amount of the cleaning solvent, the number of times of cleaning) of the cleaning solvent of the cleaning solvent S2 in use. Further, the control unit 14 of the sample injection device 10 is configured to determine whether or not the cleaning solvents S2 in use has been used up based on the acquired used amount of the cleaning solvents S2 in use.

For example, the control unit 14 of the sample injection device 10 determines that the cleaning solvent S2 in use has been used up when it is determined that the remaining amount of the cleaning solvent S2 in use is less than or equal to a predetermined threshold value based on the used amount of the cleaning solvents S2 in use. Further, the control unit 14 of the sample injection device 10 determines that the cleaning solvent S2 in use has not been used up when it is determined that the remaining amount of the cleaning solvent S2 in use is less than or equal to a predetermined threshold value based on the acquired used amount of the cleaning solvent S2 in use.

Further, the control unit 14 of the sample injection device 10 is configured to perform the control to change the setting of the position of the cleaning solvents S2 to be used in the arrangement unit 12 from the position of cleaning the used-up solvent S2 to the position of a new cleaning solvent S2 (unused spare cleaning solvent S2) when it is judged that the cleaning solvent S2 in use has been used up. With this, the control to change the cleaning solvent S2 to be used to a new cleaning solvent S2 is performed without changing the actual position of the cleaning solvent S2. After the changing of the cleaning solvents S2 to be used, the control unit 14 of the sample injection device 10 is configured to perform the control to use a new cleaning solvent S2 based on the new setting of the position of the cleaning solvent S2 used in the arrangement unit 12.

Effects of this Embodiment

In this embodiment, the following effects can be obtained.

In this embodiment, as described above, the sample injection device 10 is configured to be able to set the cleaning order of the syringe 11 by plural kinds of cleaning solvents S2. With this, unlike the case in which the cleaning order of the syringe 11 by plural kinds of cleaning solvents S2 is fixed, the cleaning order of the syringe 11 by plural kinds of cleaning solvents S2 can be changed, so the degree of freedom in setting of the cleaning order can be improved. As a result, for example, the cleaning order can be changed such that a cleaning solvent S2 having high cleanliness due to the small number of times of use cleans the syringe 11 immediately before an injection of the sample S1. In this case, the cleaning of the syringe 11 immediately before the injection of the sample S1 is performed by a cleaning solvent S2 with high cleanliness, which can effectively reduce mixing of the previous sample S1 into the current sample S1 (so-called carryover). Therefore, the cleaning effect of the syringe 11 can be effectively enhanced by plural kinds of cleaning solvents S2.

Further, for example, the cleaning order can be changed so that the plural kinds of cleaning solvents S2 are used in the polarity order. In this case, it is possible to enhance the cleaning effect of the syringe 11 by plural kinds of cleaning solvents S2 by taking advantage of the fact that substances close in polarity are soluble with each other. As described above, it is possible to provide a sample injection device 10 capable of enhancing the cleaning effect of the syringe 11 by plural kinds of cleaning solvents S2 by improving the degree of freedom in setting of the cleaning order.

Moreover, in this embodiment, as described above, the sample injection device 10 is configured to be able to individually set the cleaning order before the injection of the sample S1 by the syringe 11 and the cleaning order after the injection of the sample S1 by the syringe 11. With this, before and after the injection of the sample S1 by the syringe 11, the cleaning order of the syringe 11 by plural kinds of cleaning solvents S2 can be changed individually, so the degree of freedom in setting of the cleaning order can be further improved. As a result, the cleaning effects of the syringe 11 by plural kinds of cleaning solvents S2 can be further enhanced.

Further, in this embodiment, as described above, the sample injection device 10 is configured such that the cleaning order specified by the user is set as the cleaning order. With this, the cleaning order desired by the user can be set as the cleaning order. As a result, the user can set the cleaning order suitable for the physical properties of the sample S1 and the cleaning solvents S2. Therefore, the cleaning effects of the syringe 11 by a plurality of kinds of cleaning solvents S2 can be assuredly enhanced depending on the physical properties of the sample S1 and the cleaning solvents S2.

Further, in this embodiment, as described above, the sample injection device 10 is configured such that the cleaning order is set according to the physical properties of the sample S1. With this, the cleaning order suitable for physical properties of the sample S1 can be automatically set, so it is possible to save time and labor of the user for setting the cleaning order. Further, even if the user is not familiar with physical properties of the sample S1, the cleaning order suitable for the physical properties of the sample S1 is automatically set, so that it is possible to easily enhance the cleaning effect of the syringe 11 by plural kinds of cleaning solvents S2.

Also, in this embodiment, as described above, the sample injection device 10 is configured such that the cleaning order is set so that the plural kinds of cleaning solvents S2 become in the polarity order according to the polarity of the sample S1. With this, it is possible to easily and assuredly set a cleaning order with a high cleaning effect by taking advantage of the fact that substances close in polarity are soluble with each other.

Further, in this embodiment, as described above, the sample injection device 10 is configured such that the physical properties of the sample S1 or the cleaning solvent S2 are acquired based on the pre-stored candidate substance information indicating the physical properties of the candidate substance which is a candidate of the sample S1 or the cleaning solvent S2. With this, if there is a sample S1 or a cleaning solvent S2 to be used by the user among the candidate substances of pre-stored candidate substance information, the user can acquire the physical properties of the sample S1 or the cleaning solvent S2 simply by selecting the sample S1 or the cleaning solvent S2 to be used among from the candidate substances of the candidate substance information. In this case, the user is not required to perform the operation of entering the physical properties of the sample S1 or the cleaning solvent S2, which eliminates the need for the user to input the physical properties of the sample S1 or the cleaning solvent S2.

Also, in this embodiment, as described above, the sample injection device 10 is configured so that the number of times of cleaning the syringe 11 by the cleaning solvent S2 is set according to the physical properties of the sample S1. With this, it is possible to automatically set the number of times of cleaning suitable for the physical properties of the sample S1, so that it is possible to save time and labor of the user for setting the number of times of cleaning. Further, even if the user is not familiar with the physical properties of the sample S1, the cleaning order suitable for the physical properties of the sample S1 is automatically set, so that it is possible to easily enhance the cleaning effect of the syringe 11 by plural kinds of cleaning solvents S2.

Further, in this embodiment, as described above, the sample injection device 10 is configured such that the number of times of cleaning is set so that the number of times increases as the viscosity of the sample S1 increases. With this, the adhesion amount of the sample S1 to the syringe 11 increases as the viscosity of the sample S1 increases, so it is possible to easily and assuredly set the number of times of cleanings with high cleaning effect in consideration of the increase in number of times of cleaning.

Further, in this embodiment, as described above, a plurality of cleaning solvents S2 of the same kind is arranged in the arrangement unit 12. Further, the sample injection device 10 is configured to provide the control unit 14 which performs the control to change cleaning solvents S2 to be used so that a used-up cleaning solvents S2 is changed to a new cleaning solvent S2 of the same kind as the used-up cleaning solvents S2 when the cleaning solvent S2 has been used up. Note that when using a cleaning solvent S2, the cleaning solvent volatilizes during use since the syringe 11 is used to pierce the septum (lid) of the vial 30 containing the cleaning solvent S2. For this reason, when using a plurality of cleaning solvents of the same kind in parallel, evaporation of solvents S2 occurs in all of the a plurality of cleaning solvents being used in parallel. In this case, there is a disadvantage that the volatilization amount of the cleaning solvent S2 is increased.

Therefore, by configuring as described above, after using up a certain cleaning solvent S2, it is possible to use the same kind of a new cleaning solvent S2 as the used-up cleaning solvent S2, so that, unlike the case of using a plurality of cleaning solvents S2 of the same kind in parallel, as to the unused cleaning solvent S2, the solvent is prevented from being volatilized until the start of use. As a result, the volatilization amount of the cleaning solvent S2 can be reduced, so that the same kind of cleaning solvents S2 can be efficiently used when a plurality of cleaning solvents of the same kind is prepared.

Modified Embodiment

It should be understood that the embodiments disclosed here are examples in all respects and are not restrictive. The scope of the present invention is shown by the scope of the claims rather than the descriptions of the embodiments described above, and includes all changes (modifications) within the meaning of equivalent and the scope of claims.

For example, in the above-described embodiment, the setting device is an example configured by a personal computer, but the present invention is not limited to this. In the present invention, the setting device may be configured by a device other than a personal computer as long as the setting of the sample injection device is possible. For example, the setting device may be configured by a chromatography apparatus. Further, for example, the setting device may be configured by the sample injection device.

In the above-described embodiment, an example is shown in which the sample injection device is configured to be able to set the cleaning solvent, the cleaning order, the amount of the cleaning solvent, and the number of times of cleaning, but the present invention is limited thereto. In the present invention, the sample injection device may not necessarily be able to set the cleaning solvent, the amount of the cleaning solvent, and the number of times of cleaning as long as at least the cleaning order can be set.

In the above-described embodiment, an example is shown in which the sample injection device is configured to be able to individually set the cleaning solvent, the cleaning order, the amount of the cleaning solvent, and the number of times of cleaning, but the present invention is limited thereto. In the present invention, the sample injection device may be configured to be able to set the cleaning solvent, the cleaning order, the amount of the cleaning solvent, and the number of times of cleaning only either one before the injection of the sample or after the injection of the sample.

In the above-described embodiment, an example is shown in which the sample injection device is configured to set the cleaning order in accordance with the polarity of the sample, but the present invention is not limited to this. In the present invention, the sample injection device may be configured to set the cleaning order according to the physical properties of the sample other than the polarity.

In the above-described embodiment, the sample injection device is configured such that the cleaning order is set so that the plural kinds of cleaning solvents become in the polarity order according to the polarity of the sample, but the present invention is not limited to this. In the present invention, the sample injection device may be configured such that the cleaning order is set so that the plural kinds of cleaning solvents become in the polarity order according to the polarity of the plural kinds of cleaning solvents. In this case, it is possible to automatically set the cleaning order so that the plural kinds of cleaning solvents become in the polarity order even if the information on the polarity of the sample is not input to the setting device.

In the above-described embodiment, an example is shown in which the candidate substance information is stored in advance in the setting device, but the present invention is not limited to this. In the present invention, the candidate substance information stored in advance may not necessarily be stored in the setting device. In this case, for example, the setting device may be configured such that information on the sample or the cleaning solvent is input by the user when performing the setting regarding the cleaning.

Further, in the above-described embodiment, an example is shown in which the sample injection device is configured such that the cleaning order is input in accordance with the polarity of the sample, but the present invention is not limited to this. In the present invention, the sample injection device may be configured such that the number of times of cleaning is set in accordance with the physical properties of the sample other than the viscosity. Further, the sample injection device may be configured such that the number of times of cleaning is set in accordance with the viscosity of the cleaning solvent.

Further, in the above-described embodiment, an example is shown in which the sample injection device is configured to change the cleaning solvent to be used so as to use the same kind of cleaning solvent as the used-up cleaning solvent when the cleaning solvent has been used up, but the present invention is not limited to this. In the present invention, the sample injection device is not always required to be configured to change the cleaning solvent to be used so as to use the same kind of cleaning solvent as the used-up cleaning solvent when the cleaning solvent has been used up. For example, the sample injection device may be configured to use a plurality of cleaning solvents of the same kind in parallel.

The invention claimed is:

1. A sample injection system comprising:
a sample injection device; and
a setting device,
wherein the sample injection device includes:
   a syringe for injecting a sample for analysis by a gas chromatography apparatus,
   a table in which plural kinds of cleaning solvents having different physical properties for cleaning the syringe are arranged, and
   a syringe mover for moving the syringe,
wherein the setting device includes:
   a processor, and a memory storing data on a polarity of the sample for the analysis by the gas chromatography apparatus and data on polarities of the cleaning solvents, wherein the processor is configured to set a cleaning order of the syringe by the plural kinds of cleaning solvents based on the data on the polarity of the sample for the analysis by the gas chromatography apparatus and the data on the polarities of the cleaning solvents, wherein the syringe mover is configured to move the syringe based on an information of cleaning solvents included in the cleaning order and an information of positions of the cleaning solvents, and wherein the cleaning order is set to include a first sequence of cleaning solvents before an injection of the sample by the syringe and a second sequence of cleaning solvents subsequent to the injection of the sample by the syringe, wherein sequence of cleaning solvents, the difference between the polarity of a first cleaning solvent used in the first sequence of cleaning solvents and the polarity of the sample is greater than the difference between the polarity of a last cleaning solvent used in the first sequence of cleaning solvents and the polarity of the sample, and wherein in the second sequence of cleaning solvents, the difference between the polarity of a first cleaning solvent used in the second sequence of cleaning solvents and the polarity of the sample is less than the difference between the polarity of a last cleaning solvent used in the second sequence of cleaning solvents and the polarity of the sample.

2. The sample injection system as recited in claim 1, wherein the processor is configured to individually set the first sequence of cleaning solvents and the second sequence of cleaning solvents.

3. The sample injection system as recited in claim 1, wherein the processor is configured such that a number of times of cleaning the syringe by the cleaning solvents is set according to physical properties of the sample.

4. The sample injection system as recited in claim 3, wherein the processor is configured such that the number of times of cleaning is set so that the number of times of cleaning increases as viscosity of the sample increases.

5. The sample injection system as recited in claim 1, wherein a plurality of cleaning solvents having a same physical property is arranged in the table, and wherein the sample injection device is configured to perform a control to change the cleaning solvents to be used so that a new cleaning solvent having the same physical property as a used-up cleaning solvent is used when the cleaning solvent is used up.

* * * * *